United States Patent [19]

Marugg et al.

[11] Patent Number: 5,120,815
[45] Date of Patent: Jun. 9, 1992

[54] TERTIARY AMINE-CONTAINING POLYOLS PREPARED IN A MANNICH CONDENSATION REACTION USING A MIXTURE OF ALKANOLAMINES

[75] Inventors: John E. Marugg, Ev Leiden, Netherlands; Michael A. P. Gansow, Duesseldorf, Fed. Rep. of Germany; Johan A. Thoen, HB Terneuzen, Netherlands

[73] Assignee: The Dow Chemical Company, Midland, Mich.

[21] Appl. No.: 373,857

[22] Filed: Jun. 29, 1989

[51] Int. Cl.⁵ .............................. C08G 18/28
[52] U.S. Cl. ........................ 528/73; 528/77; 528/79; 528/153; 528/162
[58] Field of Search ............ 521/167, 136, 164; 260/2.5; 528/53, 76, 73; 524/100; 560/88

[56] References Cited

U.S. PATENT DOCUMENTS

| 4,525,488 | 6/1985 | Cuscurida et al. | 521/164 |
| 4,883,826 | 11/1989 | Marugg et al. | 521/164 |
| 4,939,182 | 7/1990 | Marugg et al. | 521/136 |

*Primary Examiner*—John Kight, III
*Assistant Examiner*—Shelley A. Wright

[57] ABSTRACT

An improved process for preparing Mannich polyols is disclosed. The process involves capping a Mannich condensate of a phenolic compound or an amino-substituted s-triazine with a small quantity of an alkylene oxide in the absence of an alkylene oxide polymerization catalyst, prior to heating the condensate to elevated temperatures at which polycondensates are formed. The capped Mannich condensate is then alkoxylated to form the desired polyol.

13 Claims, No Drawings

TERTIARY AMINE-CONTAINING POLYOLS PREPARED IN A MANNICH CONDENSATION REACTION USING A MIXTURE OF ALKANOLAMINES

BACKGROUND OF THE INVENTION

This invention relates to polyols containing one or more tertiary amine atoms, which are prepared in a Mannich condensation reaction to form a tertiary amine-containing intermediate which is subsequently alkoxylated.

Polyol precursor materials made by alkoxylating a Mannich condensation product (Mannich polyols) are known to be useful in preparing certain types of polyurethanes. Because these Mannich polyols contain tertiary nitrogen atoms, they are often auto-catalytic, i.e., are sufficiently reactive with isocyanate groups that they can be used to prepare polyurethanes with reduced levels of urethane catalysts, or even none at all. These Mannich polyols are typically of low equivalent weight, which makes them particularly suited to preparing rigid polyurethane foam, although their use as a crosslinker in semiflexible polyurethane foams is known as well. See U.S. Pat. No. 4,371,629.

The Mannich polyols used in polyurethane foams are prepared by alkoxylating a condensation product of phenol or a substituted phenol, formaldehyde, and diethanol amine. Such Mannich polyols are described, for example, in U.S. Pat. Nos. 3,297,597, 4,137,265 and 4,383,102, incorporated herein by reference. One problem with these Mannich polyols is that, due to the occurrence of side reactions in their preparation, they tend to be mixtures of single ring and multiring compounds rather than relatively pure materials. Worse, the extent to which multiring compounds are formed varies from batch to batch, so that successive batches of these Mannich polyols have varying properties. The presence of the multiring compounds causes the viscosity of the polyols to be higher than sometimes desired.

It would be desirable to provide a process for preparing Mannich polyols whereby the formation of multiring compounds is minimized or substantially eliminated. It would also be desirable to provide a process whereby the rate of alkoxylation of the Mannich condensate is increased.

SUMMARY OF THE INVENTION

This invention is an improvement in a process for preparing Mannich polyols wherein a phenolic compound or amino-substituted s-triazine derivative is reacted with formaldehyde and an alkanolamine to form a Mannich condensate which is subsequently at least partially dewatered and then alkoxylated, the improvement comprising reacting the Mannich condensate, prior to heating said condensate to a temperature at which the condensate forms significant quantities of multiring compounds, with about 0.2 to about 2 moles of an alkylene oxide per hydroxyl group on the Mannich condensate in the substantial absence of an alkylene oxide polymerization catalyst, to form a capped condensate, and then alkoxylating the capped condensate in the presence of an alkylene oxide polymerization catalyst.

By reacting the crude Mannich condensate with an alkylene oxide before complete dewatering, the condensate is stabilized and is less likely to engage in additional condensation reactions which form multiring compounds. Accordingly, the Mannich polyols prepared are more homogeneous in composition than those made in conventional processes, and can be prepared more reproducibly, i.e., with less lot-to-lot variation in properties.

DETAILED DESCRIPTION OF THE INVENTION

The polyol of this invention is prepared by alkoxylating a Mannich condensation product, which is stabilized before heating to high temperatures by reacting it with an alkylene oxide in the substantial absence of an alkylene oxide polymerization catalyst.

The Mannich condensation is well known in the art. It involves the reaction of a phenolic compound or an amino-substituted s-triazine compound, formaldehyde and a primary or secondary amine. In this invention, the phenolic compound used is one having at least one phenolic hydroxyl group. Preferably, the phenolic compound contains substantially one hydroxyl group which is bound to a carbon in an aromatic ring. The phenolic compound may contain other substituents which do not undesirably react under the conditions of the Mannich condensation reaction, the subsequent alkoxylation reaction, or the preparation of polyurethanes from the final product. Among such substituent groups are alkyl, aryl, alkoxy, phenoxy, halogen, nitro and similar groups. Preferred substituent groups are halogen, particularly chlorine, and $C_1$–$C_{18}$, more preferably $C_1$–$C_{12}$ alkyl group(s). In addition to single ring phenolic compounds, fused ring compounds such as the various naphthols and hydroxy-anthracenes are useful herein. Exemplary phenolic compounds include phenol, o-, p-, or m-cresols, ethylphenol, nonylphenol, dodecylphenol, p-phenylphenol, the various bisphenols including 2,2-bis(4-hydroxyphenyl)propane (bisphenol A), β-naphthol, β-hydroxyanthracene, p-chlorophenol, o-bromophenol, 2,6-dichlorophenol, p-nitrophenol, 4- or 2-nitro-6-phenylphenol, 2-nitro-6- or -4-methylphenol, 3,5-dimethylphenol, p-isopropylphenol, 2-bromo-6-cyclohexylphenol and the like. Preferred phenolic compounds include phenol and monoalkyl phenols, with $C_{1-10}$ para-alkyl phenols and phenol being more preferred. Phenol and para-n-nonylphenol are most preferred on the basis of ready availability and desirable properties.

Also useful in preparing the Mannich condensate or s-triazine compounds having at least one amino group attached to a carbon atom in the triazine ring. Such triazine compounds include those represented by the structure.

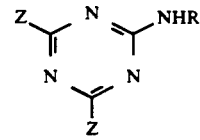

wherein R is hydrogen, inertly substituted aryl or unsubstituted or inertly substituted alkyl and each Z is independently $NR_2$, hydrogen, or unsubstituted or inertly substituted alkyl. By inertly substituted, it is meant that the substituent group contains no moiety which undesirably interferes with the condensation reaction, an alkoxylation of the resulting condensate, or the reaction of the condensate or alkoxylated condensate with a polyisocyanate. Preferably, each R is independently hydrogen or $C_1-C_4$ alkyl, most preferably hydrogen. Each Z is preferably $NR_2$, $C_1-C_4$ alkyl, $C_1-C_4$ hydroxyalkyl, hydroxyl or hydrogen, and most preferably is $NH_2$. Exemplary compounds include melamine, ammelide, ammeline, guanamine, benzoguanamine and the like. Melamine is most preferred because it is readily available and provides excellent flame retardancy to an isocyanate-based polymer prepared from the condensate or the alkoxylated condensate.

The formaldehyde used is in any convenient form, with paraformaldehyde, trioxane, "inhibited" methanol solutions and the commonly available aqueous formalin solutions being exemplary. In commercial processes, the formaldehyde is preferably used as a concentrated aqueous solution, particularly as a 37% aqueous solution.

The alkanolamine is either a monoalkanolamine, in which the nitrogen atom is mono- or disubstituted, or a dialkanolamine which is characterized by having two alkanol groups attached to a secondary nitrogen atom. The alkanol group on the monoalkanolamine is any which is unsubstituted or inertly substituted, with primary or secondary hydroxyl-substituted groups having about 2 to about 12, preferably 2 to about 6, more preferably about 2 to about 4 carbon atoms. The monoalkanolamine can also contain an inert substituent on the nitrogen atom, such as $C_1-C_{12}$, preferably $C_1-C_6$, alkyl and/or aryl substitution. Examples of such suitable monoalkanolamines are methylethanolamine, ethylethanolamine, methylisopropanolamine, ethylisopropanolamine, methyl-2-hydroxybutylamine, phenylethanolamine, ethanolamine, isopropanolamine and the like.

While monoalkanolamines can be used, they provide a lower functionality than do dialkanolamines, and their use is therefore less preferred. The preferred dialkanolamines advantageously contain primary or secondary hydroxyl-substituted alkyl groups having from about 2 to about 12, preferably about 2 to about 6, more preferably about 2 to about 4 carbon atoms. Exemplary dialkanolamines used herein include diethanolamine, diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and the like. Of these, diethanolamine, diisopropanolamine and ethanolisopropanolamine are preferred. Mixtures of the foregoing dialkanolamines can also be used. Of particular interest are mixtures of diethanolamine and another alkanolamine, especially diisopropanolamine or ethanolisopropanolamine, as the use of these mixtures provides a condensate having a relatively low viscosity and a desirable reactivity.

The alkanolamine is normally employed in roughly equimolar quantities with the formaldehyde, such as at a ratio of about 1 mole of formaldehyde to about 0.75 to about 1.5 moles of alkanolamine.

In conducting the Mannich reaction with a phenolic compound, the ratios of phenolic compound, formaldehyde and alkanolamine can be varied somewhat to produce a condensate of a desired functionality. Phenolic compounds are typically susceptible to Mannich condensation at the positions ortho and para to the hydroxyl group. Thus, for a single ring phenolic compound, up to three potential condensation sites are present. Accordingly, the number of condensation reactions which occur on average per molecule during the Mannich reaction will depend to a great extent on the molar ratios of components. In this invention, a molar ratio of phenolic compound to formaldehyde of about 1:0.9 to about 1:3.5 is advantageously used. When it is desired to add only one (dialkanol)aminomethyl group, a ratio of closer to about 1:1 is preferred. Similarly, if an average of about two such groups are desired, a ratio of about 1:1.75 to about 1:2.5 is preferred. Likewise, a ratio of about 1:2.5 to about 1:3.5 is preferred when it is desired to add a average of more than two such groups. In this invention, it is preferred to add an average of about 1.5 to about 2.5, and more preferred to add an average of about 1.75 to about 2.25 (dialkanol)aminomethyl groups per molecule, and a molar ratio of phenolic compound to formaldehyde of about 1:1.75 to about 1:2.5 is most preferred.

Similarly, the ratio of substituted s-triazine formaldehyde and alkanolamine depends on the number of primary and secondary amino groups on the substituted s-triazine, as well as the desired functionality of the condensate. Since each primary or secondary amino group on the substituted s-triazine is a potential condensation site, up to three moles of formaldehyde can react per mole of substituted s-triazine. In this invention, a molar ratio of substituted s-triazine to formaldehyde of about 1:0.9 to about 1:3.5 is advantageously used. When the substituted s-triazine contains only one primary or secondary amino group, or it is desired to add only one (dialkanol)aminomethyl group to a more highly aminosubstituted s-triazine, a ratio of closer to about 1:1 is preferred. Similarly, if an average of about two such groups are desired, a molar ratio of about 1:1.75 to about 1:2.5 is preferred. Likewise, a ratio of about 1:2.5 to about 1:3.5 is preferred when it is desired to add a average of more than two such groups. In this invention, it is preferred to add an average of about 1.5 to about 3, and more preferred to add an average of about 2 to about 3 (dialkanol)aminomethyl groups per molecule, and a molar ratio of substituted s-triazine to formaldehyde of about 1:1.75 to about 1:3.5 is most preferred.

In conducting the Mannich condensation reaction, the phenolic or s-triazine compound, formaldehyde and alkanolamine are combined and permitted to react. When a phenolic compound is used, it is preferred to first mix the phenolic compound and alkanolamine, and then add the formaldehyde slowly so as to minimize the exotherm. However, it is also possible to prereact the formaldehyde and alkanolamine, and then add this intermediate to the phenolic compound. In either case, water is stripped from the reaction mixture during the reaction in order to drive the reaction toward completion.

In a preferred process, the formaldehyde is added, with stirring, to the mixture of phenolic compound and alkanolamines slowly in order to control the exotherm of the reaction. Suitably, the rate of addition is chosen in order to maintain a temperature of about 30 to about 100, preferably about 50 to about 80, more preferably about 60° to about 70° C. Following the formaldehyde addition, the mixture is maintained at an elevated temperature until the reaction is essentially complete. This can be determined by monitoring the water content of the mixture, as the condensation reaction produces water. As described below, in the usual processing, water is stripped from the reaction mixture as the reaction proceeds. As the reaction is completed, water is no longer produced, so when the water content becomes less than about 5% by weight, substantial completion of the reaction is indicated. The temperature is not especially critical, but is preferably below that temperature at which a substantial quantity of Novolac formation occurs, and is sufficiently high on the other hand to provide an economically feasible reaction rate. Temperatures of about 40° to about 100° C are preferred, with about 50 to about 80° C. being more preferred, and 60° to about 75° C. being most preferred.

When an s-triazine compound is used, it is preferred to make a precondensate from the formaldehyde and s-triazine compound, followed by reaction with the alkanolamine. The formaldehyde is added to the substituted s-triazine at a rate which minimizes the exotherm. After the addition of the formaldehyde, it is generally useful to heat the mixture at an elevated temperature, such as about 30-100, preferably about 50-90, more preferably about 60°-80° C. in order to complete the reaction. A heating time of about 10 minutes to about 10 hours, preferably about 30 minutes to about 3 hours, is generally sufficient for this purpose. Completion of the reaction is sometimes indicated by the mixture becoming clear.

The condensate thus obtained preferably has a basicity of about 3.7 to about 7.1 meq/g, more preferably from about 4.1 to about 6.0 meq/g for a dicondensate. It preferably has a basicity of about 2.3 to about 5.8, more preferably about 2.8 to about 4.2 meq/g for a monocondensate. For a tricondensate, it preferably has a basicity of about 4.8 to about 7, preferably about 5.2 to about 6.5 meq/g.

Following the completion of the condensation reaction, water is advantageously removed from the Mannich condensate. It is preferred to remove water under reduced pressure at a temperature of about 30 to about 100, preferably about 60 to about 100, more preferably about 80° to about 90° C. Water is advantageously removed until the Mannich condensate has a water content of less than about 5%, preferably less than about 1.5%, more preferably about 0.1 to about 1% by weight.

In conventional processes, the condensate is further heated to about 50° to about 130° C., preferably about 100° to about 125° C., following removal of the water to further drive the reaction to completion. The applicants have found, however, that exposing the condensate to such elevated temperatures causes the product to undergo further condensations, forming multiring compounds. These increase the viscosity of the polyol, so that it is harder to use in making polyurethanes. The formation of these higher condensates also varies from batch to batch, making it difficult to prepare a reproducible product.

In this invention, the condensate is stabilized against further condensation by capping it with about 0.2 to about 2 moles of an alkylene oxide per hydroxyl group on the condensate, prior to heating the condensate under conditions whereunder substantial amounts of multiring species are formed. When less than about 0.2 moles of alkylene oxide are used in the capping step, no significant reduction in the formation of multiring compounds is seen, whereas greater than about 2 moles of alkylene oxide, per hydroxyl group on the condensate, are added only with difficulty in the absence of an alkylene oxide polymerization catalyst. Preferably about 0.4 to about 1.2 moles, more preferably about 0.4 to about 0.8 moles, of alkylene oxide per hydroxyl group on the condensate are added in this manner.

The capping is advantageously conducted prior to heating the condensate to a temperature in excess of about 100° C., preferably prior to heating it to a temperature in excess of about 95° C., more preferably prior to heating it to a temperature in excess of about 90° C., and most preferably prior to heating it to a temperature in excess of about 85° C.

The capping reaction is advantageously performed after the major portion of the water is removed from the condensate, in order to minimize the formation of diols due to alkoxylation of water molecules. Preferably, the water content is reduced to below about 5% by weight, more preferably from about 100 to about 2000 ppm, most preferably from about 100 to about 1200 ppm prior to capping.

It has surprisingly been found that the capping reaction usually proceeds rapidly in the absence of the conventionally used basic alkylene oxide polymerization catalysts such as are described below, and it is preferred not to use such catalysts in the capping step. The alkylene oxide used in the capping step is as described below, with propylene oxide and ethylene oxide being preferred. Ethylene oxide is especially preferred, as it reacts rapidly with the condensate, and also further reacts rapidly with additional alkylene oxides to prepare the final product.

The capped Mannich condensate is then further alkoxylated to prepare the polyol of this invention. The alkoxylation is advantageously conducted to add an average total of about 0.5 to about 25, preferably about 0.5 to about 5, more preferably about 0.5 to about 1.5, even more preferably about 0.75 to about 1.2 moles of alkylene oxide per hydroxyl group on the Mannich condensate prior to capping. Most preferably, an average of about 1 to about 1.2 moles of alkylene oxide are added per hydroxyl group on the Mannich condensate prior to capping.

The alkoxylation is advantageously conducted by reacting the hydroxyalkyl groups of the Mannich condensate with an alkylene oxide as is well known in the art. The phenolic hydroxyl group(s) may or may not be alkoxylated.

The alkylene oxide used herein is any compound having an cyclic ether group and which is unsubstituted or inertly substituted, i.e., has no substituent groups which undesirably react with the Mannich condensate or which undesirably react under the conditions encountered in forming a polyurethane from the alkoxylated Mannich condensate. The cyclic ether group is preferably an α,β-oxirane, i.e., a three-membered cyclic ether ring. Preferred cyclic aliphatic ethers include those represented by the structure:

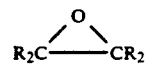

wherein each R is independently hydrogen or an unsubstituted or inertly substituted hydrocarbon group, including unsubstituted or inertly substituted alkyl, aryl or arylalkyl groups. Exemplary inert substituent groups include acyclic ether, nitro, halogen, particularly chlorine or bromine, and like groups. Particularly preferred alkylene oxides include ethylene oxide, propylene oxide, 1,2- or 2,3-butylene oxide, the various isomers of hexane oxide, styrene oxide, epichlorohydrin, epoxycyclohexane, epoxycyclopentane, and the like. Most preferred, on the basis of performance, availability and cost, are ethylene oxide, propylene oxide, butylene oxide, and mixtures thereof, with ethylene oxide, propylene oxide or mixtures thereof being most especially preferred.

The manner by which the alkoxylation reaction is conducted is not especially critical to the invention. The cyclic aliphatic ether is advantageously added to the Mannich condensate at an elevated temperature, such as about 50 to about 180, preferably about 70 to about 160, more preferably about 90° to about 150° C. In the usual case where a volatile cyclic aliphatic ether is used, the reaction is preferably conducted under superatmospheric pressure, although superatmospheric pressure is not particularly beneficial when a non-volatile cyclic aliphatic ether is used. A catalyst is also advantageously used to provide a commercially viable reaction rate. Any catalyst which enhances the rate of polymerization of alkylene oxides is useful herein. Examples of such catalysts include basic compounds such as alkali metal hydroxides, alkali metal alkoxides, alkaline earth alkoxides, alkali metal and alkaline earth naphthenates, tertiary amine compounds, and the like, including those described, for example, in U.S. Pat. Nos. 3,393,243 and 4,595,743, incorporated herein by reference. Alkali metal hydroxides are generally preferred, especially potassium hydroxide. Suitable processes for reacting a Mannich condensate with a cyclic aliphatic ether are disclosed, for example, in U.S. Pat. Nos. 3,297,597, 4,371,629, and 4,137,265.

Following the polymerization of the cyclic aliphatic ether, the resulting Mannich polyol is advantageously worked up by removing unreacted alkylene oxide, such as by vacuum stripping, and by removing or deactivating any residual catalyst, such as by neutralization with a weak acid and/or filtration.

A surprising aspect of this invention is that it provides for a substantial decrease in the time required to conduct the alkoxylation, even when the catalyst is omitted in the capping reaction. This is believed to be due in part to the stabilization of the condensate by the capping reaction, which permits the use of higher temperatures in the final alkoxylation, which accordingly shortens the necessary reaction time.

The polyol of this invention is of particular interest in preparing polyurethanes, especially rigid polyurethane or polyurethane-polyisocyanurate foam. In making such polyurethanes, the polyol of this invention is reacted with a polyisocyanate, optionally in the presence of a blowing agent, other isocyanate-reactive compounds, surfactants and other auxiliaries useful in producing polyurethanes.

Polyisocyanates useful in making polyurethanes include aromatic, aliphatic and cycloaliphatic polyisocyanates and combinations thereof. Representative of these types are diisocyanates such as m- or p-phenylene diisocyanate, toluene-2,4-diisocyanate, toluene-2,6-diisocyanate, hexamethylene- 1,6-diisocyanate, tetramethylene-1,4-diisocyanate, cyclohexane-1,4-diisocyanate, hexahydrotoluene diisocyanate (and isomers), naphthylene-1,5-diisocyanate, 1-methylphenyl-2,4-phenyldiisocyanate, diphenylmethane-4,4'-diisocyanate, diphenylmethane-2,4'-diisocyanate, 4,4'-biphenylenediisocyanate, 3,3'-dimethoxy-4,4'-biphenylenediisocyanate and 3,3'-dimethyldiphenylpropane-4,4'-diisocyanate; triisocyanates such as toluene-2,4,6-triisocyanate and polyisocyanates such as 4,4'-dimethyldiphenylmethane-2,2',5',5'-tetraisocyanate and the diverse polymethylenepolyphenylpolyisocyanates.

A crude polyisocyanate may also be used in the practice of this invention, such as the crude toluene diisocyanate obtained by the phosgenation of a mixture of toluene diamines or the crude diphenylmethane diisocyanate obtained by the phosgenation of crude diphenylmethanediamine. The preferred undistilled or crude polyisocyanates are disclosed in U.S. Pat. No. 3,215,652, incorporated by reference.

Especially preferred are methylene-bridged polyphenylpolyisocyanates, due to their ability to crosslink the polyurethane. The isocyanate index (ratio of equivalents of isocyanates to equivalents of active hydrogen-containing groups) is advantageously from about 0.9 to about 10, preferably about 1.0 to about 4.0, more preferably about 1.0 to about 1.5.

In addition to the Mannich polyol and the polyisocyanate, various other components are useful in preparing polyurethanes. An additional isocyanate-reactive material, i.e., one which is not a Mannich polyol of this invention, may be employed in conjunction with the Mannich polyol of this invention. Preferably, the Mannich polyol constitutes at least about 20, more preferably at least about 50, most preferably at least about 70 weight percent of the combined weight of the Mannich polyol and the additional isocyanate-reactive material.

Suitable additional isocyanate reactive materials for preparing rigid polyurethanes include those having an equivalent weight of about 50 to about 400, preferably about 70 to about 200 and more preferably about 70–150. Such additional isocyanate-reactive materials also advantageously have a functionality of at least 3, preferably about 3 to about 8 active hydrogen atoms per molecule.

Suitable additional isocyanate-reactive materials include polyether polyols, polyester polyols, polyhydroxy-terminated acetal resins, hydroxyl-terminated amines and polyamines, and the like. Examples of these and other suitable isocyanate-reactive materials are described more fully in U.S. Pat. No. 4,394,491, particularly in columns 3–5 thereof. Most preferred for preparing rigid foams, on the basis of performance, availability and cost, is a polyether polyol prepared by adding an alkylene oxide to an initiator having from about 2 to about 8, preferably about 3 to about 8 active hydrogen atoms. Exemplary such polyols include those commercially available under the trade names Voranol® 250-473, Voranol® 240-360, Voranol® 270-370, Voranol® 240-446, Voranol® 240-490, Voranol® 575, Voranol® 240-800, all sold by The Dow Chemical Company, and Pluracol 824, sold by BASF Wyandotte.

In making the preferred rigid foam, a blowing agent is suitably employed to impart a cellular structure to the foam. Useful blowing agents include those materials which generate a gas under the conditions of the polymerization of the reaction mixture. Exemplary such materials include water, which reacts with isocyanate groups to liberate carbon dioxide, low boiling halogenated hydrocarbons such as fluorocarbons and fluorochlorocarbons, finely divided solids such as pecan flour, the so-called "azo" blowing agents which liberate nitrogen, and the like. Preferred blowing agents include water and the low boiling halogenated hydrocarbons. Water is particularly preferred in appliance and similar formulations, as it improves the flow properties of the formulation. When the polyurethane foam is desired to have thermal insulative characteristics, the blowing agent composition preferably comprises a low boiling halogenated hydrocarbon. Such blowing agents remain in the cells of the foam and contribute to the insulating properties thereof. Exemplary low boiling halogenated hydrocarbons include methylene chloride, tetrafluoromethane, trifluorochloromethane, dichlorodifluoromethane, CFC-142B, CFC-123, CFC-141B (all isomers) and the like.

Other auxiliaries useful in producing polyurethanes include surfactants, pigments, colorants, fillers, fibers, antioxidants, catalysts, flame retardants, stabilizers and the like. In making polyurethane foam, it is generally highly preferred to employ a minor amount of a surfactant to stabilize the foaming reaction mixture until it cures. Such surfactants advantageously comprise a liquid or solid organosilicone surfactant. Other, less preferred surfactants include polyethylene glycol ethers of long chain alcohols, tertiary amine or alkanolamine salts of long chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, about 0.2 to about 5 parts of the surfactant per 100 parts by weight polyol are sufficient for this purpose.

One or more catalysts for the reaction of the polyol (and water, if present) with the polyisocyanate are advantageously used. Any suitable urethane catalyst may be used, including tertiary amine compounds and organometallic compounds. Exemplary tertiary amine compounds include triethylenediamine, n-methyl morpholine, pentamethyldiethylenetriamine, tetramethylethylenediamine, 1-methyl-4-dimethylaminoethylpiperazine, 3-methoxy-N- dimethylpropylamine, N-ethyl morpholine, diethylethanolamine, N-coco morpholine, N,N-dimethyl- N',N'-dimethyl isopropylpropylenediamine, N,N-diethyl-3-diethylaminopropylamine, dimethylbenzylamine and the like. Exemplary organometallic catalysts include organomercury, organolead, organoferric and organotin catalysts, with organotin catalysts being preferred among these. Suitable organotin catalysts include stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates, such as an alkali metal alkoxide, may also optionally be employed herein. Such catalysts are used in an amount which measurably increases the rate of reaction of the polyisocyanate. Typical amounts are about 0.001 to about 1 part of catalyst per 100 parts by weight of polyol.

In making a polyurethane foam, the polyol(s), polyisocyanate and other components are contacted, thoroughly mixed and permitted to expand and cure into a cellular polymer. The particular mixing apparatus is not critical, and various types of mixing head and spray apparatus are conveniently used. It is often convenient, but not necessary, to pre-blend certain of the raw materials prior to reacting the polyisocyanate and active hydrogen-containing components. For example, it is often useful to blend the polyol(s), blowing agent, surfactants, catalysts and other components except for polyisocyanates, and then contact this mixture with the polyisocyanate. Alternatively, all components can be introduced individually to the mixing zone where the polyisocyanate and polyol(s) are contacted. It is also possible to pre-react all or a portion of the polyol(s) with the polyisocyanate to form a prepolymer, although such is not preferred.

The polyurethane foam of this invention is useful in a wide range of applications, due to the desirable viscosity and reactivity of the Mannich polyol. Accordingly, not only can spray insulation be prepared, but appliance foam, rigid insulating boardstock, laminates, and many other types of rigid foam can easily be prepared with the Mannich polyol of this invention. Flexible foam is useful as, for example, cushioning material in mattresses, furniture, automobile seating and the like.

The following examples are given to illustrate the invention and are not intended to limit the scope thereof. Unless stated otherwise, all parts and percentages are given by weight.

EXAMPLE

A Mannich condensate is prepared by reacting para-nonylphenol, formaldehyde and diethanolamine in a 1:2:2 molar ratio. A 5 liter reactor is charged with 5 moles of nonylphenol and 10 moles of diethanolamine. This mixture is heated to 50° C., and with continuous stirring 10 moles of formaldehyde are added dropwise as a 37% by weight aqueous solution. The resulting mixture is then stirred for 16 hours at a temperature of about 60°-70° C., and then heated to 100° C. for 2 hours. The resulting condensate is then stripped under vacuum (1-10 mbar) at about 80° C., until the water content of the condensate is <1000 ppm. To the resulting condensate are then added 10 moles of propylene oxide under slight nitrogen pressure, while maintaining a temperature of about 100° C. After a combined feed and cook-down time of four hours, 1000 ppm potassium hydroxide are added as a 50% aqueous solution, followed by an additional 10 moles of propylene oxide, at a temperature of about 130° C. After a total feed plus cook-down time of 10 hours, 1000 ppm formic acid are added at 100° C. to neutralize the catalyst, followed by removal of residual formic acid under reduced pressure. The resulting polyol is indicated as Sample No. 1.

For comparison, a Mannich polyol is made in similar manner, except that all the propylene oxide is added in a single step, without catalyst, at about 100° C. After 40 hours at 100° C. the reaction of the propylene oxide is not complete. In another comparison, all the propylene oxide is added in a single step, with 1000 ppm potassium hydroxide catalyst. A total feed and reaction time of 16-20 hours is needed, even though the catalyst is present throughout the reaction. It is seen, therefore, that the process of this invention unexpectedly decreases the time required to alkoxylate the Mannich condensate.

The time required to alkoxylate the Mannich condensate is further reduced when ethylene oxide is used in the capping step. When Sample No. 1 is repeated, except substituting ethylene oxide for the propylene oxide in the capping step, the combined feed and cook-down time in the first step is only 1.5 hours, and that of the final alkoxylation is only 6 hours.

What is claimed is:

1. An improved process for preparing a Mannich polyol wherein a phenolic compound or amino-substituted s-triazine derivative is reacted with formaldehyde and an alkanolamine to form a Mannich condensate which is subsequently at least partially dewatered and then alkoxylated, the improvement comprising reacting the Mannich condensate, prior to heating said condensate to a temperature at which the condensate forms significant quantities of multiring compounds, with about 0.2 to about 2 moles of an alkylene oxide per hydroxyl group on the Mannich condensate in the substantial absence of a basic alkylene oxide polymerization catalyst to form a capped Mannich condensate, and then alkoxylating the capped Mannich condensate in the presence of an alkylene oxide polymerization catalyst.

2. The improved process of claim 1 wherein said Mannich condensate is not heated to a temperature in excess of about 90° C. prior to the capping reaction.

3. The improved process of claim 2 wherein the Mannich condensate is capped with about 0.4 to about 0.8 moles of ethylene oxide, propylene oxide, or a mixture thereof per hydroxyl group on the Mannich condensate.

4. The improved process of claim 2 wherein the Mannich condensate is a condensate of a phenolic compound, formaldehyde and diethanolamine, diisopropanolamine or a mixture thereof.

5. The improved process of claim 4 wherein the Mannich condensate is capped with about 0.4 to about 0.8 moles of ethylene oxide, propylene oxide, or a mixture thereof per hydroxyl group on the Mannich condensate, and the capped Mannich condensate is alkoxylated with ethylene oxide, propylene oxide or a mixture thereof.

6. The improved process of claim 5 wherein the Mannich condensate is capped with ethylene oxide and the capped Mannich condensate is alkoxylated with propylene oxide.

7. The improved process of claim 6 wherein the phenolic compound is phenol or nonylphenol.

8. The improved process of claim 2 wherein the Mannich condensate is a condensate of an amino-substituted s-triazine, formaldehyde and diethanolamine, diisopropanolamine or a mixture thereof.

9. The improved process of claim 8 wherein the amino-substituted s-triazine is melamine, the Mannich condensate is capped with about 0.4 to about 0.8 moles of ethylene oxide, propylene oxide, or a mixture thereof per hydroxyl group on the Mannich condensate, and the capped Mannich condensate is alkoxylated with ethylene oxide, propylene oxide or a mixture thereof.

10. A Mannich polyol prepared by the process of claim 1.

11. A Mannich polyol prepared by the process of claim 4.

12. A Mannich polyol prepared by the process of claim 7.

13. A Mannich polyol prepared by the process of claim 8.

* * * * *